United States Patent
Ferstenberg

[15] 3,672,348
[45] June 27, 1972

[54] APPARATUS FOR REGULATING THE UPPER SURFACE CONTOUR OF EXPANDED CELLULAR PRODUCTS

[72] Inventor: Charles Ferstenberg, Paramus, N.J.
[73] Assignee: Tenneco Chemicals, Inc., New York, N.Y.
[22] Filed: April 27, 1970
[21] Appl. No.: 41,659

Related U.S. Application Data

[62] Division of Ser. No. 750,034, Aug. 5, 1968, Pat. No. 3,560,599.

[52] U.S. Cl. ..................425/364, 425/89, 425/4, 425/817
[51] Int. Cl. ..........................................B29f 1/00
[58] Field of Search................................18/4 B, 4 S

[56] References Cited

UNITED STATES PATENTS

| | | |
|---|---|---|
| 2,921,346 | 1/1960 | Fischer..........................18/4 B X |
| 3,296,658 | 1/1967 | Buff et al.......................18/4 B |
| 3,488,800 | 1/1970 | Kornylak........................18/4 B |

FOREIGN PATENTS OR APPLICATIONS

| 1,044,321 | 1966 | Great Britain....................18/4 B |

*Primary Examiner*—H. A. Kilby, Jr.
*Attorney*—Henry T. Burke, Robert Scobey, Robert S. Dunham, P. E. Henninger, Lester W. Clark, Gerald W. Griffin, Thomas F. Moran, R. Bradlee Boal and C. C. Dunham

[57] ABSTRACT

Control of upper contour of foamed materials formed in an open top mold by selective control of lateral pressure to the rising foam and a conveyor type molding apparatus for achieving this control in continuous production.

4 Claims, 8 Drawing Figures

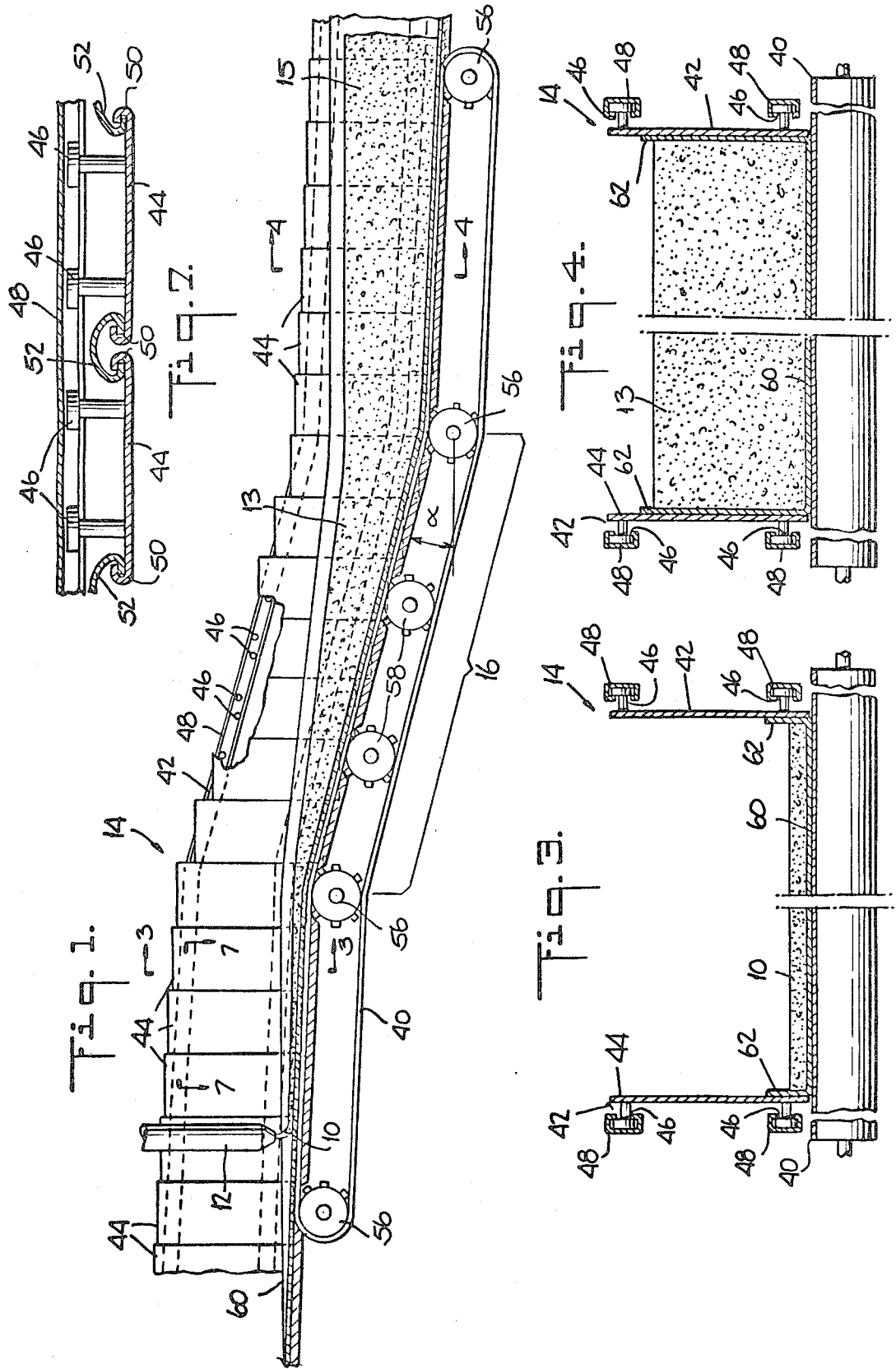

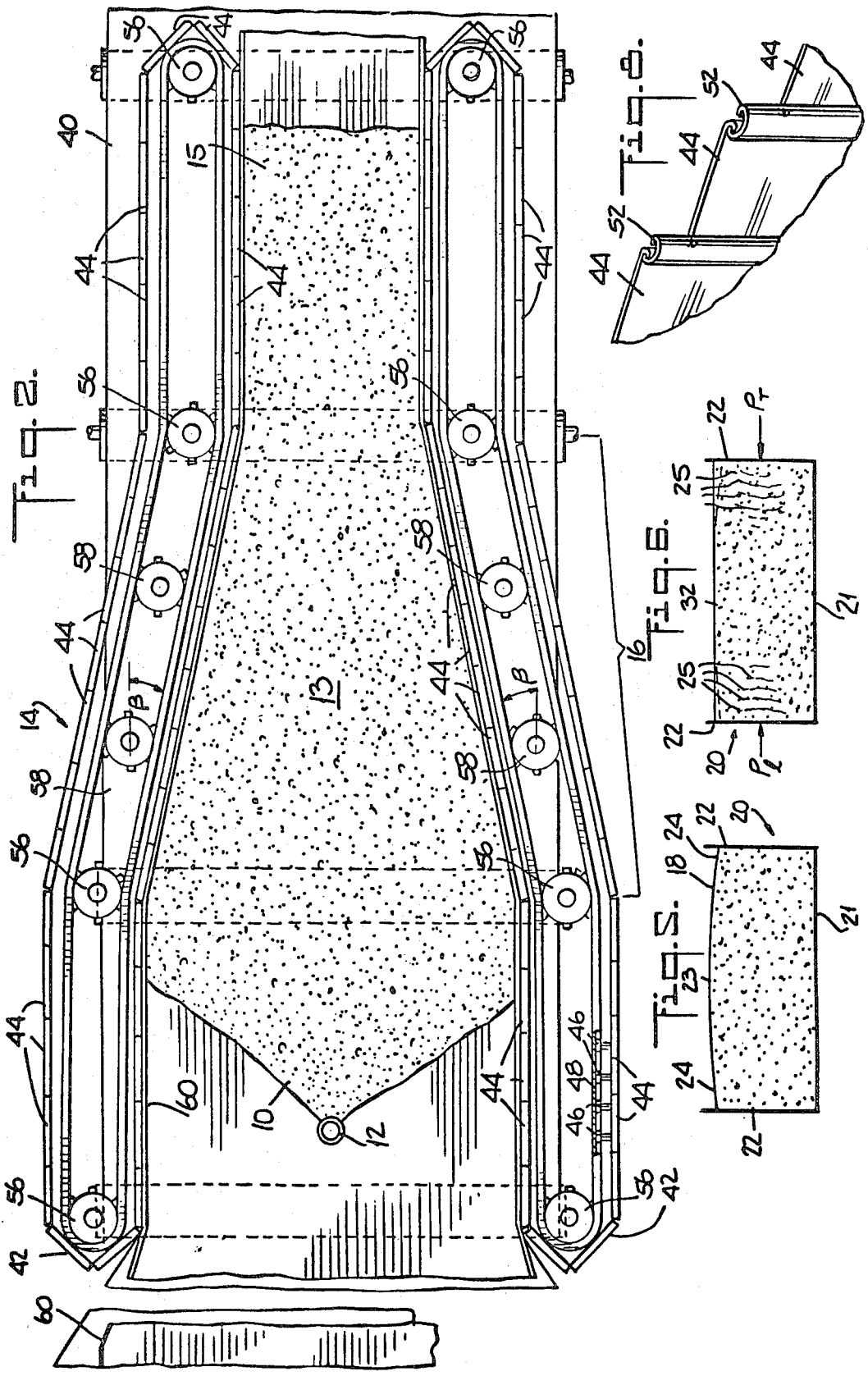

APPARATUS FOR REGULATING THE UPPER SURFACE CONTOUR OF EXPANDED CELLULAR PRODUCTS

This application is a divisional application of U.S. patent application Ser. No. 750,034, now U.S. Pat. No. 3,560,599.

This invention relates to the manufacture of expanded cellular products and more particularly it concerns novel arrangements for controlling the outer contour of such products.

The present invention is particularly useful in connection with the production of continuous slats or blocks of foamed polyurethane material from a liquid reaction mixture. These blocks are generally formed by pouring the liquid reaction mixture into an open top mold and allowing the mixture to foam and rise, and eventually to solidify in the mold. This process may be carried out continuously in a very effective manner by constructing the mold in the configuration of an endless or loop type conveyor which moves continuously past and away from the liquid pouring point. When the liquid reaction mixture is poured onto the conveyor-mold it undergoes the foaming and solidifying reactions while it is being supported in proper contour and at the same time is being carried away from the pouring point. Thus, the liquid reaction mixture may be poured continuously at the pouring point so long as the conveyor-mold is moving at proper speed.

A problem has long existed in connection with the use of open top molds for forming expanded cellular products. This problem involves the control of the upper contour of the finished product. In general, the product will assume the mold contour in those regions where it contacts the mold. However, in order to accomodate the rising foam and the evolution of gases therefrom, the upper portion of the molding apparatus is left open. Thus, there is no positive upper surface to control the upper contour of the rising foam.

It is a phenomenon of rising foams, such as polyurethane foams which rise from liquid reaction mixtures to become self-supporting expanded cellular products, that the natural rising action is greater in the center of the product than it is at the vertical sides. Accordingly, there is produced a crown-shaped or bulged upper surface. In general, the material in the crown has less commercial value than the remainder of the block, mainly because of its shape.

The present invention permits the formation, in an open top mold, of a foamed cellular product having a controlled upper contour which may, if desired, be flat. This controlled upper contour is achieved without undue difficulty or expense; and provides a commercially significant increase in yield of prime quality foam per pound of reactants.

According to one aspect of the present invention, control of the top surface contour of the foam is achieved by selectively altering the extent of foam rise across the horizontally transverse direction of the foaming substance. This is achieved by exerting a horizontally transverse compressive force on the vertical sides of the rising foam.

The present invention, in one aspect, makes use of the unusual ability of solid or liquid foam material to absorb and dissipate compressive stresses. The novel results of this invention arise from our discovery of a means of utilizing the unique behavior of such material. That is, contrary to the behavior of an essentially incompressible solid or confined liquid, a foaming substance, that is not completely confined, particularly during the period of rising when it is still moldable, does not transmit uniformly throughout its mass and equalize applied stresses. Thus, by imposing a laterally-directed compressive stress at the sides of the foaming substance, a pressure variation is set up across the transverse direction of the rising substance which is relieved by the greatest proportionate upward movement of the portions of the foam subjected to the greatest compressive stress, i.e. along the sides of the rising foam. Upward movement occurs along the sides of the rising foam because this is the direction of least resistance to flow of the rising foam that is subjected to the lateral compressive stresses, thereby producing a flattened top surface contour in the rising foam. Dissipation of that component of the transversely applied stress which acts in the machine direction of movement of the rising foam does not adversely affect achievement of the desired formation of a flat top surface contour.

According to a further aspect of the present invention, there is provided a novel conveyor type molding apparatus which is capable of applying horizontally transverse compressive stress in a selective manner to the vertical sides of rising foam contained therein, thereby to alter the foam rise pattern and more particularly its top surface contour according to a predetermined pattern. This novel conveyor type molding apparatus of the present invention, contrary to prior conveyor type molding devices which have parallel side walls throughout their length, actually employs a transition region wherein the sidewalls of the conveyor taper in toward or out away from each other. The particular contour, extent, length and location of the tapered transition region can be adjusted or established according to the desired final upper contour, the chemical and physical nature of the rising foam material, and other conditions affecting the foaming process.

The tapered side walls of the conveyor mold apparatus may be stationary, or, as illustratively embodied herein, they may be movable at the same speed as that of the foaming material itself. Moreover, the side walls in the tapered transition may be hinged or swivelled at two or more points so that the contour itself of the taper may be adjusted. The opposing side walls in the regions preceding and following the tapered transition region are substantially parallel to the longitudinal center line of the device.

According to still further aspect of the present invention, the extent of foam rise along the sides of the rising foam mass also is controlled selectively and aided by reducing the frictional resistance to foam rise along the vertical sides of the rising foam in a novel manner. This is achieved by allowing the side walls of the foam carrier web to rise along with the foam as hereinafter described. More specifically, the rising foam is contained within a flexible one-piece carrier web which is supported in open-top container-like configuration in the conveyor-mold having a tapered transition region.

In the past, the techniques employed to overcome the vertical component of frictional resistance to the foam rise action have required side wall carrier webs that were separate from the bottom carrier web. This was done in order to permit the raising of the side wall carrier webs relative to the bottom web, or to permit the lowering of the bottom carrier web relative to the side wall carrier webs.

In the present case, it has been found that the single piece carrier web operating in a tapered transition region in a conveyor-mold will undergo such configurational changes in cross-section that the height of the side wall portions relative to the bottom wall portion of the web will increase. Thus, the sides of the rising foam experience an effective upward movement of the side wall portions of the web.

As will be seen in detail hereinafter, the side wall taper described above is accompanied by a change in bottom wall inclination, this serving to permit configurational changes in carrier web cross-section without the production or wrinkles. The bottom wall portion will drop for an inward side wall taper so that the effective rise in side wall height (relative to the bottom wall) is even further augmented.

Various further and more specific objects, features and advantages of the invention will appear from the description given below, taken in connection with the accompanying drawings, illustrating by way of example a preferred form of the invention.

In the drawings:

FIG. 1 is a side elevational section view of a conveyor type molding apparatus in which the present invention is embodied;

FIG. 2 is a plan view of the molding apparatus of FIG. 1;

FIG. 3 is a cross-sectional view taken along line 3—3 of FIG. 1;

FIG. 4 is a cross-sectional view taken along line 4—4 of FIG. 1;

FIG. 5 is a schematic illustration depicting in cross-section a rising foam substance in a molding device;

FIG. 6 is a view similar to FIG. 5 illustrating the control of foam rise according to the present invention;

FIG. 7 is a fragmentary enlarged section view taken along line 7—7 of FIG. 1; and FIG. 8 is a fragmentary perspective view showing a side conveyor construction used in the embodiment of FIG. 1.

As shown in FIGS. 1 and 2, a liquid reaction mixture 10 is poured continuously from a dispensing nozzle 12 into a continuously-moving conveyor-type molding apparatus 14.

The liquid reaction mixture 10 is a blend of substances known to those familiar with the art. These substances, when brought together, react first to form a rising foam and then to solidify into an expanded cellular product. In order to produce an expanded cellular polyurethane product, for example, the reaction mixture 10 may comprise hydroxylated polyesters, polyethers or the like mixed with organic polyisocyanates, catalysts, such as amine catalysts and stabilizers. These reaction mixture ingredients are brought together in a blending apparatus (not shown) immediately ahead of the nozzle 12 and are then distributed directly into the molding apparatus 14, at its upstream end. The mixture 10 is carried along in the molding apparatus away from the nozzle 12; and during this movement, it undergoes reactions which cause it to rise as a foam 13 and thereafter to solidify as an expanded cellular product 15.

As shown in FIGS. 3 and 4, the molding apparatus 14 is of rectangular cross-section; and it is open at the top to permit free rise of the foam 13. As the liquid reaction mixture 10 proceeds along in the molding apparatus 14 and rises as a foam 13 and solidifies into a product 15, it assumes the cross-sectional configuration of the molding apparatus walls.

It will be noted in FIGS. 2, 3 and 4 that the width of the molding apparatus 14 is not fixed as in conventional conveyor systems; but instead it actually decreases in the downstream direction along a transition region 16 in which foam rise occurs. The purpose for this inward taper is to alter the extent of rise of the foam selectively across the width of the apparatus as previously described. This transverse alteration of the extent of rise, serves to control the finished upper contour of the foamed product 15. The manner in which this occurs can be seen in the schematic views of FIGS. 5 and 6.

FIG. 5 shows in cross-section a foaming substance 18 as it rises in an open-topped rectangularly cross-sectioned molding device 20 according to its natural rise pattern. The molding device 20 has a flat bottom 21 and flat upright sides 22. It will be noted in FIG. 5 that the upper surface of the substance 18 is crowned, with a high center region 23 and lower edge regions 24. This rise pattern is caused, at least in part, by the frictional resistance to upward movement imposed on the rising foam by the sides 22 of the molding device 20.

Turning now to FIG. 6, it will be seen that the sides 22 of the molding device are movable laterally to squeeze inwardly on the foaming substance 18. This action produces a lateral stress or pressure on the sides of the substance, as indicated schematically by arrows $P_r$ and $P_1$. Now it has been found that rising foam which is incompletely confined does not transmit and equalize the compression forces applied to the side walls. Thus, as indicated by pressure contour lines 25 in FIG. 6, there is produced a pressure variation across the foaming substance 18. This pressure variation, moreover, follows a pattern according to which the pressure is toward the center and greatest toward the vertical sides of the substance.

The effect of the production of a varying transverse pressure or stress pattern in the foaming substance is to alter its rise pattern. This occurs because the foaming substance tends to rise most rapidly in the region of greatest applied pressure in an effort to reduce, or at least equalize, the pressure variation imposed on it. Rise in the vertical direction follows the path of least resistance that will relieve the pressure. Consequently, by controlling and varying the laterally-applied pressure at the side wall regions of the rising and foaming substance 18, the extent of rise at the edges of the foaming substance can be altered to match the extent of rise at its center. As a result, an essentially flat top surface contour 32 is produced.

As shown in FIGS. 1–4, the conveyor type molding apparatus is made up of a bottom conveyor 40 and two side conveyors 42. Each of these conveyors is of the linked slat type. That is, each conveyor is made up of a plurality of flat slats 44 which are linked together to form continuous loops. As can be best seen in FIGS. 3 and 4, each of the slats is provided with rollers 46 which protrude from each end and which ride in guide rails 48. The guide rails 48 are shaped to define the path each conveyor is to follow.

FIG. 7 illustrates the manner in which the individual slats 44 of the various conveyors 40 and 42 are linked together. As can be seen, each slat is bent back to provide a hook-like formation 50 along each of its longitudinal edges. These hook-like formations 50 are interconnected by brackets 52 of C-shaped cross-section. The brackets 52 link the slats 44 together in a manner allowing limited pivotal movement. Also, as illustrated in FIG. 8, the side conveyor slats can, in this arrangement, move relative to each other by a limited amount in the longitudinal direction, thereby permitting the side conveyors 42 to follow changes in inclination of the bottom conveyor 40.

As can be seen in FIG. 1, the bottom conveyor 40 extends under the dispensing nozzle 12 along a path slightly inclined from the horizontal. Thereafter, in the foam rise region 16, the bottom conveyor 40 extends along a sharper incline as indicated by the angle $\alpha$ (shown exaggerated for purposes of illustration) in FIG. 1. Beyond the region 16, the bottom conveyor 40 reverts to a more nearly horizontal inclination, parallel to the inclination of the bottom conveyor section that preceded the taper zone.

Turning now to FIG. 2, it will be seen that the two side conveyors 42 extend over the bottom conveyor and are arranged parallel to each other both upstream and downstream of the foam rise region 16. Within the foam rise region the side conveyors 42 taper in toward each other as indicated by the angle $\beta$.

In order to provide flexibility and adaptability to variations in reaction materials and molding conditions, the conveyors 40 and 42 are constructed to permit adjustment of the inclination and taper angles $\alpha$ and $\beta$, adjustment in the spacing between the side conveyors 42, and adjustment in the longitudinal extent of the region over which the angles $\alpha$ and $\beta$ are maintained. It will be appreciated that the taper and inclination angles $\alpha$ and $\beta$ need not be constant through the region 16. They may, in fact, constitute several angles which define any desired overall taper or inclination contour. As shown in FIGS. 1 and 2, the conveyors extend about sprocket wheels 56 which are driven by motor means (not shown). Similar intermediate sprocket wheels 58 may be provided. The various sprocket wheels are all positionally adjustable (by means not shown), to alter the length and longitudinal position of the taper zone, and to alter the taper zone angle and contour.

A molding web 60 of paper or other sheet-like material having a surface finish which will release easily from the liquid reaction mixture 10 or its product 15, is drawn continually from a roll or other source (not shown); and is passed through the molding apparatus 14. The molding web 60 is initially flat. However, as it approaches the upstream end of the conveyors 40 and 42, its edges 62 are bent upwardly so that in passing into the upstream end of the molding apparatus 14, the web 60 assumes a generally channel-shaped cross-sectional configuration as illustrated in FIG. 3. In this configuration, the web is carried along by the conveyors 40 and 42 under the dispensing nozzle 12 and there receives the liquid reaction mixture 10. The moving web then transfers the mixture 10 through the foam rise region 16 and on to the downstream end of the device.

As the web 60 passes through the tapered foam-rise region 16, the side conveyors 42 squeeze inwardly in a lateral direction on the web 60 while the bottom portion of the web inclines downwardly a corresponding amount causing an increase in the distance from its edges 62 to its bottom central portion. Hence, a portion of the carrier web which would in an ordinary, parallel walled conveyor system, remain in contact with the bottom conveyor, is caused to move upwardly along the side conveyors. It is in this region that the lateral-pressure and foam-rise control described above takes place. The degree of taper angle $\alpha$, and the length of the tapered foam rise region 16 is controlled so that this lateral pressure is applied to the rising foam in an amount and at a time such that it will serve to increase the rise along the vertical sides of the foam to balance the rise along the center of the foam.

Beyond the tapered foam rise region 16, the side conveyors 42 maintain the edges 62 of the web 60 parallel to each other until the reaction product 15 is fully formed. Beyond this point, the product is self-supporting and the conveyors 40 and 42 diverge away from the product, leaving it and the web 60 free to be handled for further processing.

It will be appreciated that the angle of inclination ($\alpha$) of the bottom conveyor 40 in the foam rise region 16 is mathmetically related to the inward taper ($\beta$) of the side conveyors 42. The amount of this inclination is adjusted in accordance with lateral taper ($\beta$) of the side conveyors 42 in this region. This serves to avoid wrinkling so that the web 60 may provide a smooth continuous molding surface along its interior. The amount of inclination change can be properly related to the degree of lateral taper according to known geometrical and mathematical relationships that show the path of a ray in 3 dimensions.

The present invention further serves to provide top surface contour control for the rising foam by reducing the frictional effects between the sides of the rising foam and the sides of the molding apparatus. As can be seen in FIGS. 3 and 4, as the carrier web 60 changes to a narrower width by the tapering effect of the side conveyors 42, its side walls 62 also rise, while the overall perimeter width of the web itself that is in contact with the foaming material remains the same. In addition, the level of the bottom wall portion drops in this region. As a result, the effective height of the side wall portions, relative to the bottom wall portion, increases so that the relative movement between the foam and the web is reduced in these regions. Accordingly, the resistance to foam rise is also relieved and the side wall regions of the foam rise as freely as the center thereof. As a result, the top surface contour of the risen foam becomes more nearly flat.

It may be seen that as a natural consequence of the use of an inward tapering zone in the region of foam rise, vertical relative motion of the side walls is achieved using a single channel-shaped carrier web instead of three separate carrier webs. The vertical upward motion of the single carrier web along the sidewalls matches the degree of inward taper that occurs in the foam rise zone. For example, if the side walls have an inward taper of 6 inches on each side, the portion of the carrier web that moves along the side walls will also rise 6 inches vertically as the carrier web traverses the inward tapering foam rise zone. Although the vertical upward motion of the portion of the one-piece carrier web that traverses the side walls of the tapered zone is a natural consequence of the inward taper, best use of this effect, to achieve good guidance of the carrier web through the conveyor mold apparatus, is obtained by also introducing a downward tilt in the bottom of the carrier web conveyor which matches the amount of the inward taper; in the case just described this downward tilt would amount to 6 inches over the length of the zone wherein the inward taper of the side is caused to occur.

While the present invention has been described in connection with a moving conveyor, it will be appreciated that the principles and advantages are also obtainable in a stationary conveyor mold of similar internal mold configuration, through which the foaming material passes. The zone of inward taper of the side walls in any apparatus designed according to the basic concept of this invention, may be varied to match the length of the zone over which the foam rise occurs. This length varies in accordance with the reactivity of the foaming reactant mixture, and with the speed of the conveyor mold apparatus, according to principles known to those familiar with the art. This foam rise region may vary in length from four up to 25 feet, but is most commonly in the length range of 8 to 18 feet from the reaction mixture pour point. Over the length of the inward tapering region the side walls of the conveyor mold may come together by an amount that can be varied in accordance with the reactivity of the foaming mixture and the degree of "flat-topping" desired. It has been found that this amount of taper in each side wall may be varied from zero (e.g., where the conveyor side walls are parallel) up to about 16 inches over the length of the tapered side wall region selected. In general, however, the desired top surface contour control results may be obtained with a taper in each side wall adjustable between 4 and 12 inches over the length of the tapered side wall regions selected.

Although a certain specific embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for forming an expanded cellular product having an essentially flat top surface contour from a foamable liquid reaction mixture, said apparatus comprising a conveyor type open top mold operable to transport a foamable liquid reaction mixture away from a dispensing nozzle, said conveyor in cross-section providing a horizontally extending bottom and upstanding sides to contain said mixture said mold including means for causing said sides to move progressively inwardly toward each other along a region downstream of said dispensing nozzle, and means for causing a downward inclination in said horizontally extending bottom in said region whereby a foaming reaction mixture carried by said apparatus from said nozzle is subjected to lateral squeezing in said region during the rising action of said mixture, and as a result of such lateral squeezing and downward inclination the rise pattern of said mixture is altered.

2. Apparatus as in claim 1 wherein said mold includes means to guide a web of flexible sheet material longitudinally therethrough in the same cross-sectional configuration as said conveyor to contain said reaction mixture.

3. Apparatus as in claim 2 wherein said means to guide a web includes a laterally extending bottom support and upstanding side supports, said side supports tapering inwardly toward each other along said region.

4. Apparatus as in claim 3 wherein said side supports extend substantially parallel to each other in advance of and beyond said region.

* * * * *